United States Patent
Haller

(10) Patent No.: US 9,579,995 B2
(45) Date of Patent: Feb. 28, 2017

(54) COMMERCIAL VEHICLE SEAT WITH ROTATABLE SEAT PART

(71) Applicant: GRAMMER AG, Amberg (DE)

(72) Inventor: Erwin Haller, Birgland (DE)

(73) Assignee: GRAMMER AG, Amberg (DE)

( * ) Notice: Subject to any disclaimer, the term of this patent is extended or adjusted under 35 U.S.C. 154(b) by 60 days.

(21) Appl. No.: 14/109,117

(22) Filed: Dec. 17, 2013

(65) Prior Publication Data

US 2014/0167469 A1    Jun. 19, 2014

(30) Foreign Application Priority Data

Dec. 18, 2012 (DE) .......................... 10 2012 112 523

(51) Int. Cl.
| | | |
|---|---|---|
| B60N 2/14 | (2006.01) | |
| B60N 2/16 | (2006.01) | |
| B60N 2/06 | (2006.01) | |
| B60N 2/24 | (2006.01) | |
| F16C 33/38 | (2006.01) | |
| F16C 19/10 | (2006.01) | |
| F16C 33/58 | (2006.01) | |

(52) U.S. Cl.
CPC .............. *B60N 2/146* (2013.01); *B60N 2/06* (2013.01); *B60N 2/14* (2013.01); *B60N 2/16* (2013.01); *B60N 2/1685* (2013.01); *B60N 2/24* (2013.01); *F16C 33/3856* (2013.01); *F16C 19/10* (2013.01); *F16C 33/588* (2013.01)

(58) Field of Classification Search
USPC ................................................... 297/344.26
See application file for complete search history.

(56) References Cited

U.S. PATENT DOCUMENTS 2,671,631 A  *  3/1954  Fox ........................... 248/349.1
2,854,065 A       9/1958  Fox
(Continued)

FOREIGN PATENT DOCUMENTS

CA     2337695      8/2001
CN   202480912     10/2012
(Continued)

OTHER PUBLICATIONS

U.S. Appl. No. 14/726,798, filed Jun. 1, 2015, Haller et al.
(Continued)

*Primary Examiner* — David E Allred
(74) *Attorney, Agent, or Firm* — Sheridan Ross P.C.

(57) ABSTRACT

The invention relates to a commercial vehicle seat having a seat substructure supporting part and a seat substructure base part each attached underneath a seat part, the seat substructure supporting part being movable and/or height-adjustable relative to the seat substructure base part, where the seat substructure supporting part comprises an upper supporting part joined to the underside of the seat part and a lower supporting part joined to the base part, wherein at least one roller bearing with a roller bearing ring, which extends orbitally about a notional rotary axis running in the vertical direction of said vehicle seat, is arranged between the upper supporting part and the lower supporting part, in order to rotatably support said upper supporting part relative to said lower supporting part.

11 Claims, 6 Drawing Sheets

(56) References Cited

U.S. PATENT DOCUMENTS

Figure 2:
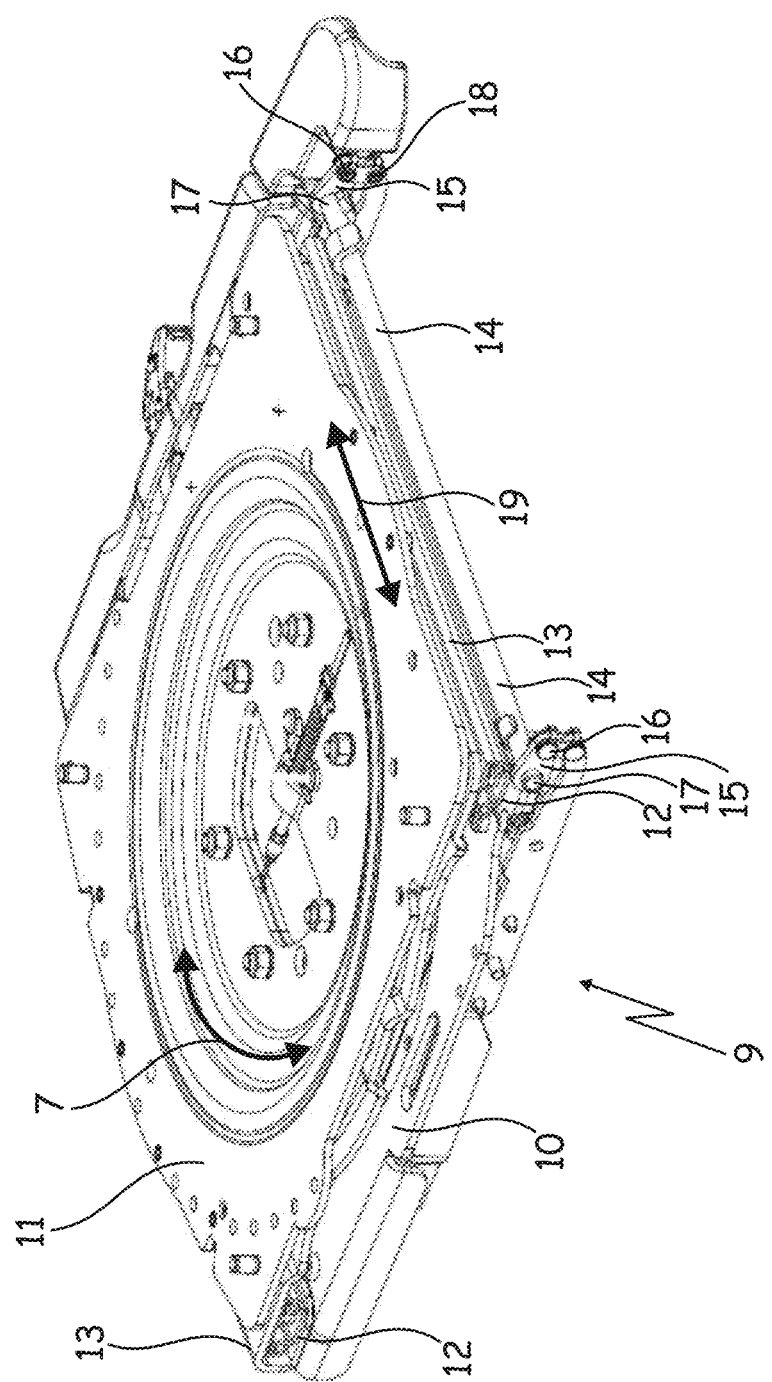

| | | | |
|---|---|---|---|
| 3,338,622 A * | 8/1967 | Bachmann | 296/65.07 |
| 3,572,817 A | 3/1971 | Colautti et al. | |
| 3,622,202 A | 11/1971 | Brown | |
| 3,659,895 A * | 5/1972 | Dresden | 296/65.05 |
| 3,860,283 A * | 1/1975 | Colautti | B61D 33/00 |
| | | | 248/425 |
| 4,097,016 A * | 6/1978 | Petrucci | 248/418 |
| 4,169,625 A | 10/1979 | Petersen | |
| 4,316,631 A | 2/1982 | Lenz et al. | |
| 4,330,160 A * | 5/1982 | Stolz et al. | 384/531 |
| 4,344,597 A | 8/1982 | Eimen | |
| 4,401,287 A | 8/1983 | Moeser | |
| 4,570,997 A | 2/1986 | Tanizaki et al. | |
| 4,588,314 A * | 5/1986 | Anscher | 384/614 |
| 4,722,617 A * | 2/1988 | Stella et al. | 384/523 |
| 4,792,188 A | 12/1988 | Kawashima | |
| 4,834,452 A | 5/1989 | Goodrich | |
| 4,971,392 A * | 11/1990 | Young | 297/256.12 |
| 5,039,164 A * | 8/1991 | Gibbs | 297/302.1 |
| 5,042,864 A | 8/1991 | Mochizuki | |
| 5,161,765 A | 11/1992 | Wilson | |
| 5,292,179 A | 3/1994 | Forget | |
| 5,395,157 A * | 3/1995 | Rollo et al. | 297/344.26 |
| 5,437,494 A | 8/1995 | Beauvais | |
| 5,518,294 A | 5/1996 | Ligon et al. | |
| 5,568,960 A | 10/1996 | Oleson et al. | |
| 5,580,129 A * | 12/1996 | Findlay | 297/344.21 |
| 5,690,385 A * | 11/1997 | Feldman et al. | 297/344.26 |
| 5,704,729 A | 1/1998 | Carnahan et al. | |
| 5,720,462 A | 2/1998 | Brodersen | |
| 5,779,309 A * | 7/1998 | Lu | 297/344.26 |
| 5,853,221 A | 12/1998 | Thoman et al. | |
| 5,882,076 A | 3/1999 | Garelick et al. | |
| 5,906,441 A * | 5/1999 | Seki | 384/528 |
| 5,975,508 A | 11/1999 | Beard | |
| 6,021,989 A * | 2/2000 | Morita et al. | 248/349.1 |
| 6,079,786 A | 6/2000 | Kirkland et al. | |
| 6,158,300 A | 12/2000 | Klingler | |
| 6,164,722 A | 12/2000 | Mabey | |
| 6,264,163 B1 | 7/2001 | Ivarsson | |
| 6,325,456 B1 | 12/2001 | Carnahan | |
| 6,402,114 B1 | 6/2002 | Carnahan et al. | |
| 6,447,065 B1 * | 9/2002 | Ropp | 297/344.21 |
| 6,557,919 B2 | 5/2003 | Hijikata et al. | |
| 6,575,420 B2 * | 6/2003 | Yoshida et al. | 248/425 |
| 6,722,737 B2 | 4/2004 | Kanai | |
| 6,877,811 B1 | 4/2005 | Garelick | |
| 7,036,883 B1 | 5/2006 | Thompson et al. | |
| 7,108,325 B2 * | 9/2006 | Williamson et al. | 297/344.24 |
| 7,121,608 B2 | 10/2006 | Billger et al. | |
| 7,140,685 B2 * | 11/2006 | Gardner | 297/344.26 |
| 7,328,952 B2 * | 2/2008 | Guerrini | 297/344.21 |
| 7,506,932 B2 | 3/2009 | Bostrom et al. | |
| 7,520,567 B2 | 4/2009 | Billger et al. | |
| 7,575,206 B2 | 8/2009 | Meier | |
| 7,845,703 B2 | 12/2010 | Panzarella et al. | |
| 7,950,740 B2 | 5/2011 | Bunea et al. | |
| 8,033,589 B2 | 10/2011 | Kusanagi et al. | |
| 8,485,600 B2 | 7/2013 | Forsman et al. | |
| 8,783,772 B2 | 7/2014 | Schuler et al. | |
| 9,073,463 B2 | 7/2015 | Kuriyama | |
| 9,085,245 B2 | 7/2015 | Haller | |
| 9,180,792 B2 * | 11/2015 | Haller | B60N 2/508 |
| 9,211,812 B2 * | 12/2015 | Haller | B60N 2/508 |
| 2002/0130528 A1 | 9/2002 | Mans | |
| 2002/0149250 A1 | 10/2002 | Silvia | |
| 2002/0190560 A1 | 12/2002 | Kohl et al. | |
| 2003/0189370 A1 | 10/2003 | Hemmer et al. | |
| 2004/0066074 A1 | 4/2004 | Ovitt | |
| 2004/0112659 A1 | 6/2004 | Kramer et al. | |
| 2004/0188582 A1 | 9/2004 | Flynn et al. | |
| 2004/0212242 A1 | 10/2004 | Gryp et al. | |
| 2004/0232399 A1 | 11/2004 | Stone | |
| 2006/0226685 A1 | 10/2006 | Priepke et al. | |
| 2007/0196038 A1 * | 8/2007 | Haepp | 384/528 |
| 2008/0031560 A1 * | 2/2008 | Fukuda | 384/512 |
| 2008/0211284 A1 * | 9/2008 | Mutou et al. | 297/354.1 |
| 2009/0102271 A1 | 4/2009 | Squires et al. | |
| 2009/0284061 A1 | 11/2009 | Maier et al. | |
| 2010/0001169 A1 | 1/2010 | Armo et al. | |
| 2010/0117413 A1 | 5/2010 | Squires | |
| 2010/0117428 A1 | 5/2010 | Deml et al. | |
| 2010/0219009 A1 | 9/2010 | Turco et al. | |
| 2010/0219909 A1 | 9/2010 | Ikeda et al. | |
| 2010/0244420 A1 | 9/2010 | Scarf | |
| 2011/0074198 A1 | 3/2011 | Iwasaki et al. | |
| 2011/0163586 A1 * | 7/2011 | Findlay | 297/344.26 |
| 2012/0237151 A1 * | 9/2012 | Felis | 384/512 |
| 2012/0305347 A1 | 12/2012 | Mori et al. | |
| 2013/0193729 A1 | 8/2013 | VanMiddendorp et al. | |
| 2014/0167470 A1 | 6/2014 | Lorey | |
| 2014/0217796 A1 * | 8/2014 | Haller | B60N 2/508 |
| | | | 297/344.26 |
| 2015/0015039 A1 | 1/2015 | Brand et al. | |
| 2015/0035334 A1 | 2/2015 | Roth et al. | |
| 2016/0001685 A1 | 1/2016 | Ulrich et al. | |

FOREIGN PATENT DOCUMENTS

| | | |
|---|---|---|
| DE | 1116987 | 11/1961 |
| DE | 2828503 | 1/1980 |
| DE | 3127625 | 6/1982 |
| DE | 3218379 | 11/1983 |
| DE | 3708399 | 9/1987 |
| DE | 4415933 | 11/1994 |
| DE | 69202551 | 2/1996 |
| DE | 69721383 | 3/2004 |
| DE | 60118068 | 8/2006 |
| DE | 202006010184 | 9/2006 |
| DE | 102006037068 | 2/2008 |
| DE | 102007021141 | 9/2008 |
| DE | 102008058409 | 7/2009 |
| DE | 102010017328 | 12/2011 |
| DE | 1020100053752 | 6/2012 |
| DE | 102011009543 | 8/2012 |
| DE | 102012112525 | 6/2014 |
| EP | 0515275 | 11/1992 |
| EP | 0921962 | 6/1999 |
| EP | 1659021 | 5/2006 |
| EP | 1824358 | 8/2007 |
| EP | 1924462 | 5/2008 |
| EP | 2213504 | 8/2010 |
| EP | 2293959 | 3/2011 |
| FR | 2201659 | 4/1974 |
| GB | 525663 | 9/1940 |
| GB | 2277494 | 11/1994 |
| JP | H06-316233 | 11/1994 |
| JP | H10-217811 | 8/1998 |
| JP | H11-198692 | 7/1999 |
| JP | 2002-211284 | 7/2002 |
| JP | 2002-306267 | 10/2002 |
| JP | 2003-063288 | 3/2003 |
| JP | 2004076778 A * | 3/2004 |
| JP | 2004-203160 | 7/2004 |
| KR | 10-2013-0056092 | 5/2013 |
| WO | WO 2004/056605 | 7/2004 |
| WO | WO 2007/028473 | 3/2007 |
| WO | WO 2010/114966 | 10/2010 |

OTHER PUBLICATIONS

U.S. Appl. No. 14/109,166, filed Dec. 17, 2013, Ott.
U.S. Appl. No. 14/109,425, filed Dec. 17, 2013, Haller.
U.S. Appl. No. 14/109,493, filed Dec. 17, 2013, Haller.
U.S. Appl. No. 14/109,540, filed Dec. 17, 2013, Haller.
English Translation of Official Action for German Patent Application No. 102012112523.6 dated Nov. 14, 2013, 2 pages.
Official Action for European Patent Application No. 13197129.3, dated Oct. 7, 2016, 2 pages.

* cited by examiner

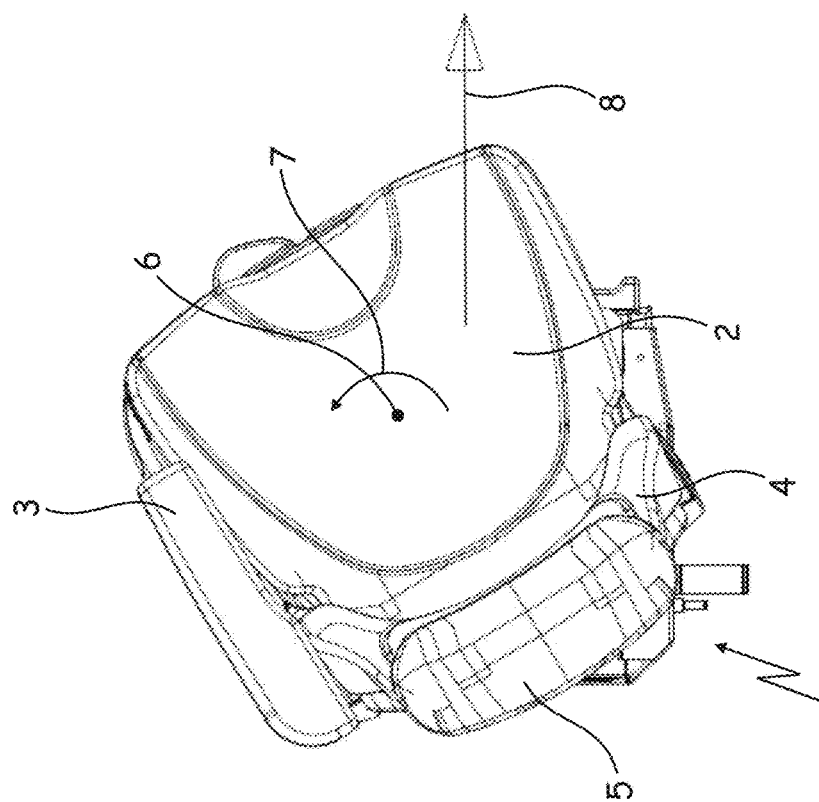
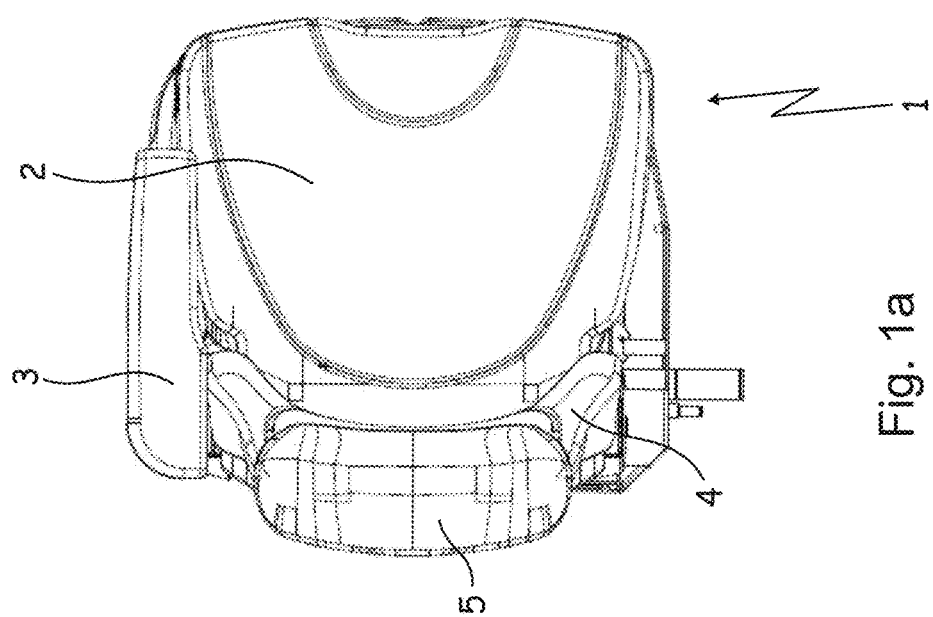

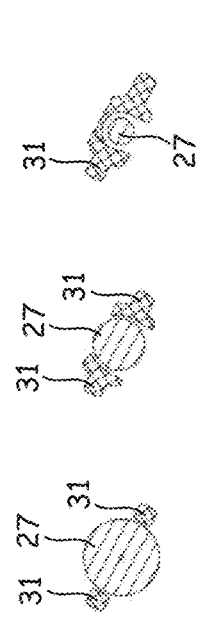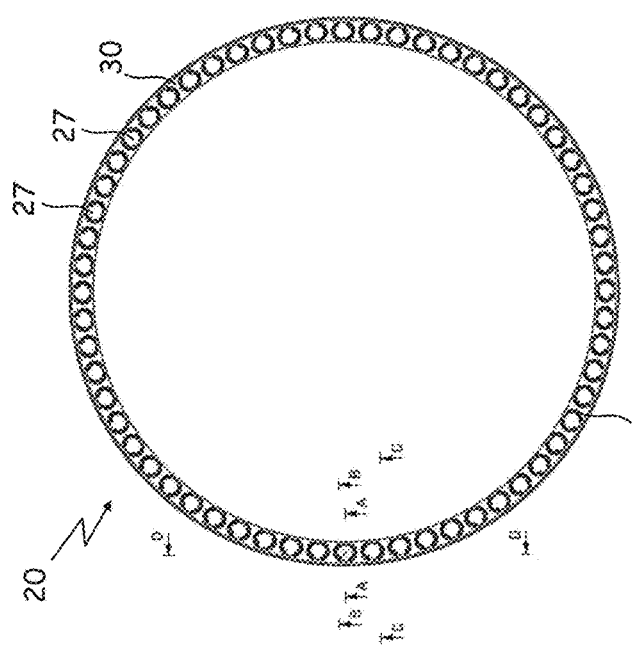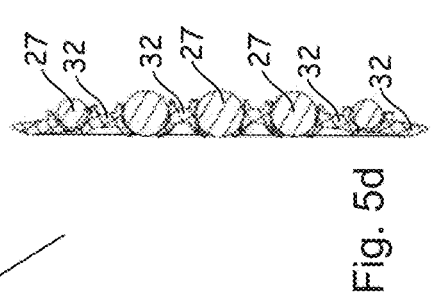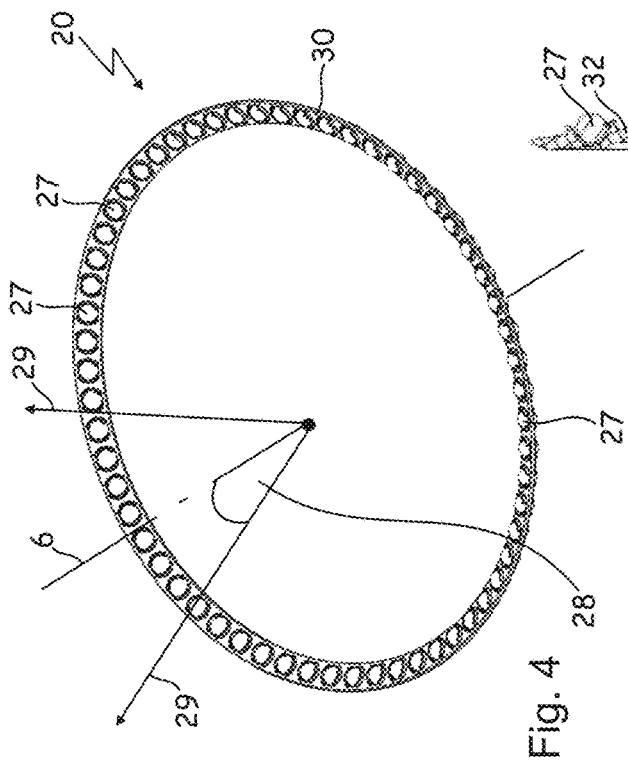

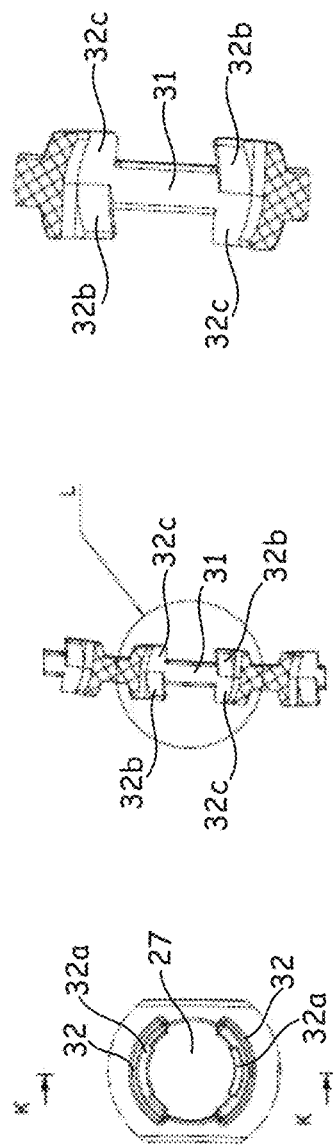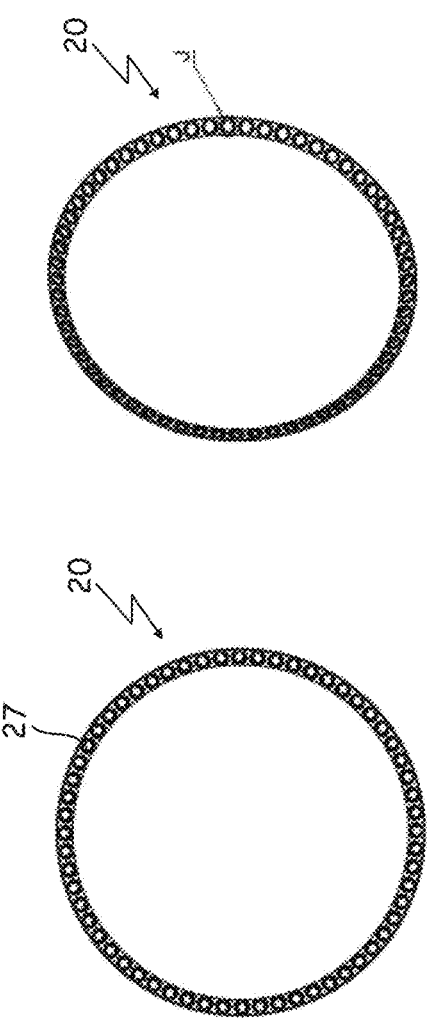

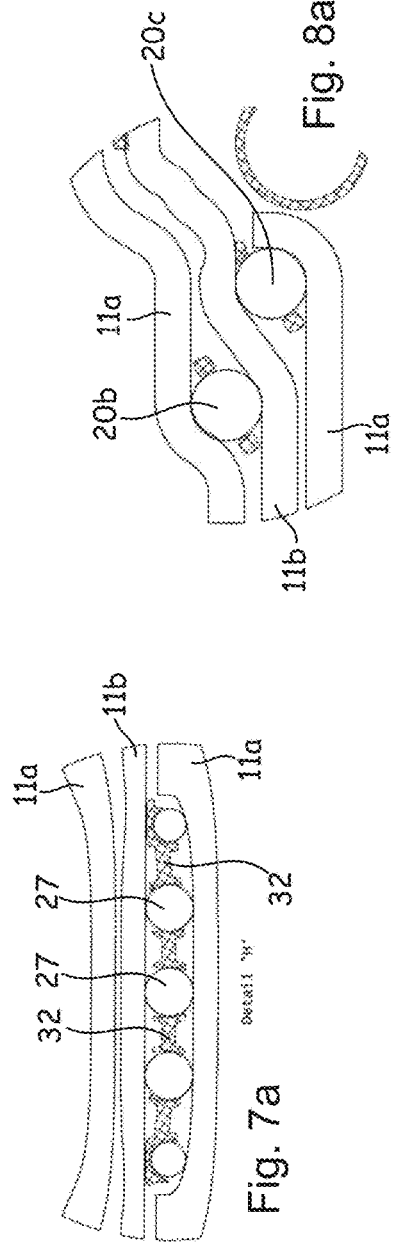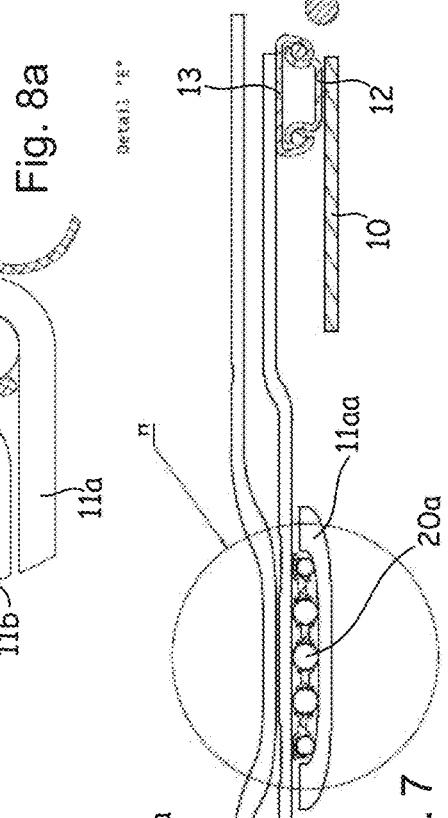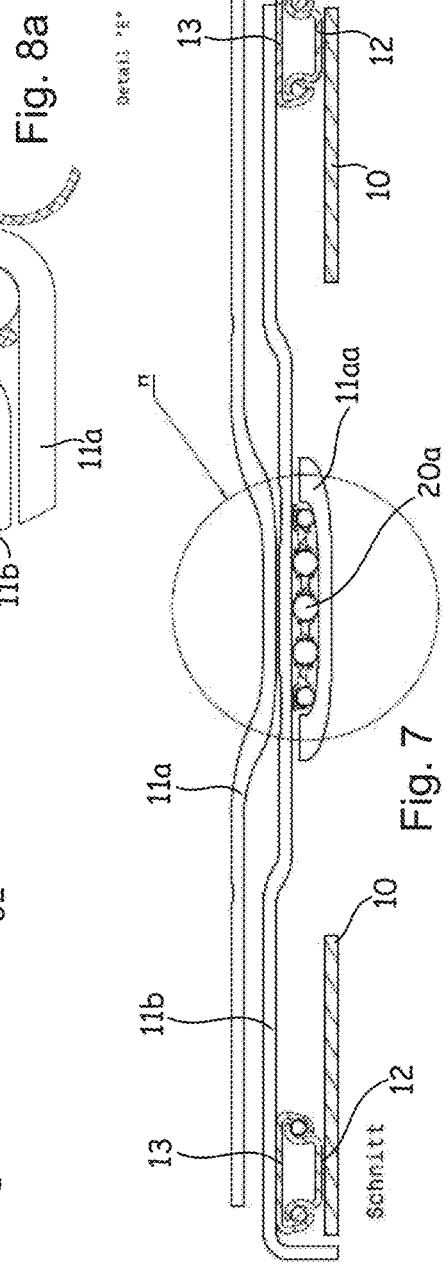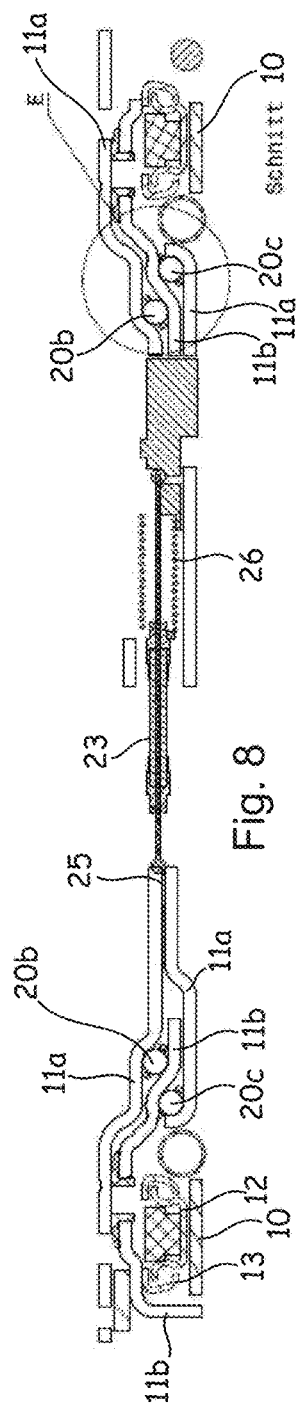

COMMERCIAL VEHICLE SEAT WITH ROTATABLE SEAT PART

CROSS-REFERENCE TO RELATED APPLICATIONS

This application claims the benefit of German Application No. 10 2012 112 523.6 filed Dec. 18, 2012, the disclosure of which is incorporated herein by reference.

DESCRIPTION

The invention relates to a commercial vehicle seat having a seat substructure supporting part and a seat substructure base part each attached underneath a seat part, the seat substructure supporting part being movable and/or height-adjustable relative to the seat substructure base part, according to the preamble of claim 1.

Commercial vehicle seats, particularly for tractors and construction vehicles, frequently have the problem that they are only aligned with the direction of travel and it is therefore difficult for the user of the vehicle seat to turn around, for example to observe the rear region of the tractor to which field cultivation equipment is attached when in use. It is also uncomfortable to get into or out of such commercial vehicle seats which are aligned in the direction of travel from the side on which a cab access door is arranged.

Hence it is the object of the invention to provide a commercial vehicle seat which provides increased comfort when observing the rear region of a commercial vehicle and when the driver is entering and leaving the commercial vehicle.

This problem is solved according to the features of claim 1.

An essential point of the invention is that in the case of a commercial vehicle seat having a seat substructure supporting part and a seat substructure base part each attached underneath a seat part, the seat substructure supporting part being movable and/or height-adjustable relative to the seat substructure base part, the seat substructure supporting part comprising an upper supporting part joined to the underside of the seat part and a lower supporting part joined to the base part, wherein at least one roller bearing with a roller bearing ring, which extends orbitally about a notional rotary axis running in the direction of elevation of said vehicle seat, is arranged between the upper supporting part and the lower supporting part, in order to rotatably support said upper supporting part relative to said lower supporting part. A commercial vehicle seat equipped in such a manner with a roller bearing enables the seat part to rotate relative to the seat substructure base part and the lower supporting part about a notional rotary axis running in the vertical direction of said vehicle seat such that on entering and leaving the vehicle, in particular on occupying and leaving the commercial vehicle seat, a manually operated or electrical, or even automatically functioning, rotation of the commercial vehicle seat takes place, that is to say towards the cab door of the commercial vehicle which is usually arranged on the side.

Equally, the commercial vehicle seat may advantageously be rotated through an angle of 1° to maximum 180°, preferably through an angle of 1° to 60°, about the notional axis in order to better observe the rear region of a tractor to which field cultivation equipment is attached during the cultivation of fields. As a result of this, the driver need not perform the entire rotation with his body and can at the same time continue to support his back on the backrest of the commercial vehicle while he observes the rear region of said commercial vehicle.

The roller bearing is preferably a ball bearing with a ball bearing race cage, the ball bearing race cage preferably being essentially configured as a ribbon. The ribbon-type ball bearing race cage may in this case extend in the widthwise direction at an angle ranging from 10° to 80° to the direction of the rotary axis. This means that overall the shape of a segment of a cone surface emerges from this for the ball bearing race cage configured like a ribbon, i.e. it represents a ribbon-type segment of the cone surface. As a result of this, the ribbon-type ball bearing race cage can absorb forces not only in the vertical direction of the vehicle but also in the lengthwise and widthwise direction of the vehicle.

If the rotational forces and also other forces, of the lengthwise and widthwise direction of the vehicle on one hand and of the vertical direction of the vehicle on the other, which act between the upper supporting part and the lower supporting part are equal in size or approximately equal in size, this determines the alignment of the ribbon-type ball bearing race cage ideally at an angle of 55° in respect of its widthwise direction to the direction of the rotary axis.

The circular, ribbon-type ball bearing race cage preferably rests on the front and back side of every ball, of which there may be, for example, 10 to 300 arranged orbitally in a closed circle, such that the individual balls are supported in their direction of rotation, i.e. in the direction of circular motion, by the ball bearing race cage and remain in their position in respect of said ball bearing race cage.

In order to enable good positioning of the ball bearing race cage together with the balls, i.e. of the ball bearing overall, between the upper supporting part and the lower supporting part, in particular if the ball bearing is configured in such a way that the ball bearing race cage is aligned in its widthwise direction of extension at an angle relative to the rotary axis, this ball bearing is arranged on the underside in a disc-shaped recess formed centrally as a negative mould in the lower supporting part and on the upper side rests on a disc-shaped positive mould formed centrally on the underside of the upper supporting part.

According to one embodiment, on the upper side the ball bearing may be supported on the underside of the lower supporting part and on the underside it may be supported in a bowl-shaped negative mould joined to the upper supporting part, said negative mould being arranged underneath the lower supporting part.

Equally, according to a further embodiment, the arrangement of two circular ball bearings with different diameters can be provided between the upper supporting part and the lower supporting part, one of these ball bearings being arranged above the lower supporting part and the other below this lower supporting part, and both ball bearings resting on the parts associated with the upper supporting part or being supported therein.

Such a commercial vehicle seat preferably comprises a locking device which is arranged for locking the upper supporting part against rotational movements relative to the lower supporting part. For example, this locking device may be joined to the upper supporting part and engage in the lower supporting part when operated or vice versa the locking device may be mounted in the lower supporting part and engage in the upper supporting part.

The locking device comprises a preferably manually operable but also an automatically and/or electrically operable, spring-loaded, movable pin element which is mounted, for example, on the upper supporting part, the pin element being capable of engaging in a recess in the lower supporting part, said recess being of complementary design to an end of the pin element.

Further advantageous embodiments emerge from the dependent claims.

Figure 3:
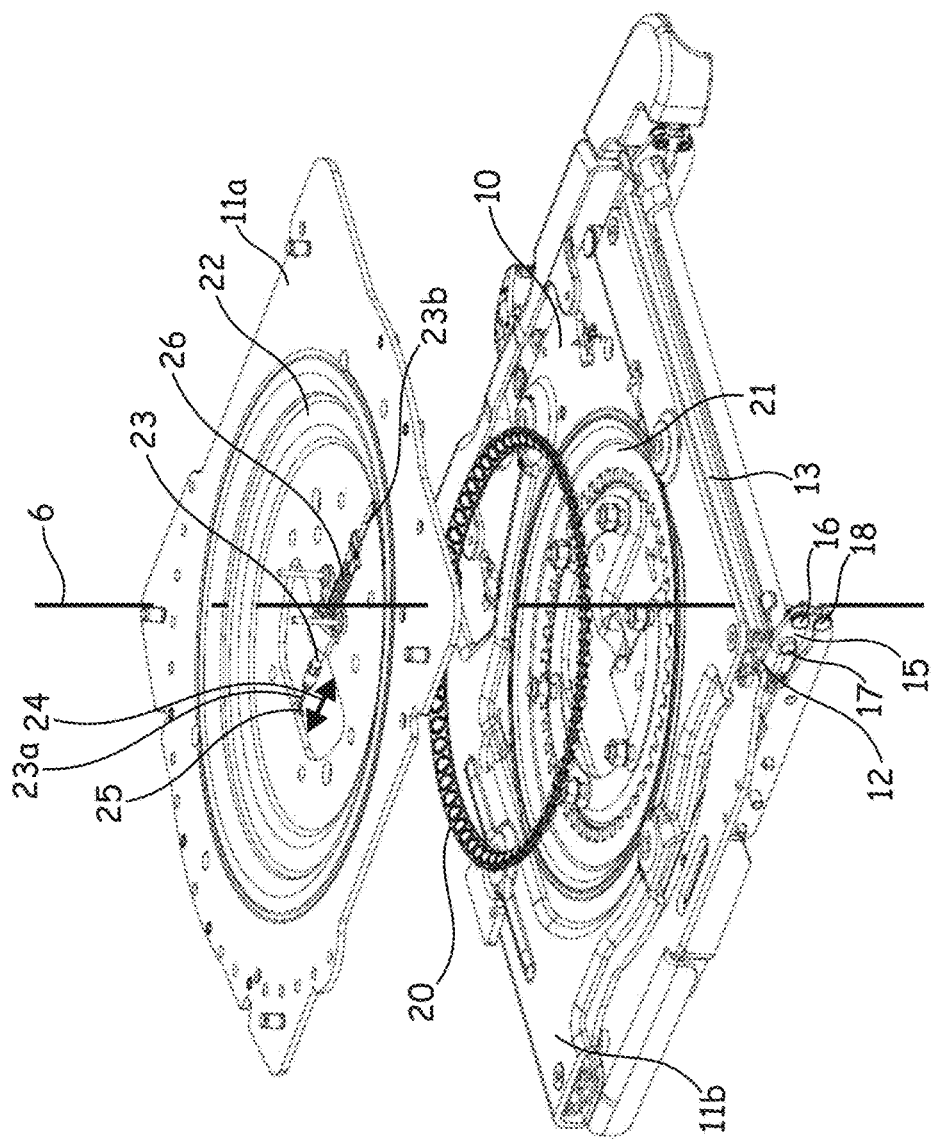

Advantages and suitabilities may be gathered in the following from the description in conjunction with the drawing. The figures show:

FIGS. 1a and 1b a commercial vehicle seat according to the invention which is illustrated aligned in the direction of travel and in a rotated position;

FIG. 2 a seat substructure supporting part of the commercial vehicle seat according to the invention in a perspective view;

FIG. 3 the seat substructure supporting part shown in FIG. 2 with the individual components in an exploded view;

FIG. 4 the ball bearing of the commercial vehicle seat according to the invention in a perspective view and as it exists when installed in the commercial vehicle seat;

FIG. 5 the ball bearing of the commercial vehicle seat according to the invention in a plan view;

FIG. 5a a sectional view along A-A as illustrated in FIG. 5;

FIG. 5b a sectional view along B-B as illustrated in FIG. 5;

FIG. 5c a sectional view along the section C-C as illustrated in FIG. 5;

FIG. 5d a sectional view along the section D-D as illustrated in FIG. 5;

FIGS. 6a and 6b the ball bearing in plan view and in a perspective view for the commercial vehicle seat according to the invention;

FIG. 6c a detailed view J as illustrated in FIG. 6b;

FIG. 6d a sectional view of the ball bearing along the section K-K as illustrated in FIG. 6c;

FIG. 6e a detailed view L of the ball bearing as illustrated in FIG. 6d;

FIG. 7 a seat substructure supporting part of the commercial vehicle seat according to a second embodiment of the invention in a lateral sectional view;

FIG. 7a a detailed view H of the seat substructure supporting part as illustrated in FIG. 7;

FIG. 8 a seat substructure supporting part for the commercial vehicle seat according to a third embodiment of the invention in a lateral sectional view;

FIG. 8a a detailed view E of the seat substructure supporting part as illustrated in FIG. 8.

FIGS. 1a and 1b show the commercial vehicle seat according to the invention both in the non-rotated and also in the rotated position. The commercial vehicle seat 1 comprises a seat part 2, an armrest 3 and a backrest 4, while a headrest 5 can also optionally be arranged.

The commercial vehicle seat 1 can be rotated about a notional rotary axis 6 along the arrow 7 in a horizontal plane relative to a forward direction of travel 8, the term horizontal plane being understood in such a manner that this plane extends in the widthwise direction of the vehicle and in the lengthwise direction of the vehicle and is only aligned horizontally when the vehicle is located on horizontally aligned ground. Otherwise this plane tilts with the pitch of the overall vehicle according to the widthwise direction and the lengthwise direction of the vehicle.

FIG. 2 renders in a perspective representation a seat substructure base part and a seat substructure supporting part in the assembled state and FIG. 3 renders individual parts in an exploded view. As can be gathered from both these figures, the seat substructure 9, which is arranged underneath the seat part 2, comprises a seat substructure base part 10, which may, for example, be joined to the body of the vehicle, and a seat substructure supporting part 11, which is joined on the upper side to the seat substructure base part 10.

The seat substructure supporting part 11 is arranged movably relative to the seat substructure base part 10 by means of rail elements 12, 13. First rail parts 13, which are located front and back or on the left- and right-hand sides on the underside of the seat substructure supporting part, cooperate slidingly with the second rail parts 12 which are located on the upper side of the seat substructure base part 10. As a result, it is possible to move the seat substructure supporting part 11 relative to the seat substructure base part 10 in the direction of the arrow 19.

In addition, the seat substructure base part 10 per se can be pivoted in the vertical direction or even be height-adjusted overall by means of a rod system 14 and levers 15 attached thereto on the front end, said levers being pivotably mounted by means of hinge joints 16, 17, 18.

The seat substructure supporting part 11 is comprised of an upper supporting part 11a and a lower supporting part 11b, both of which are predominantly flat in design and are rotatably supported in relation to each other about an axis 6. The rotational movement comes from the arrow 7 in accordance with FIG. 2.

A ball bearing 20 is arranged in the upper supporting part 11a and in the lower supporting part 11b in order to facilitate such a rotational movement. This ball bearing 20 is supported inside a disc-shaped recess 21 on the upper side of the lower supporting part 11b, the disc-shaped recess serving as a negative mould. A corresponding positive mould of complementary design is formed on the underside of the upper supporting part 11a and rests on the upper side of ball bearing 20. As a result of this, the upper supporting part 11a can rotate relative to the lower supporting part 11b about the axis 6 during movement of the ball bearing 20 and its balls respectively.

The upper supporting part 11a thus rests on the underside on the ball bearing 20.

In addition, a locking device is arranged on the upper supporting part 11a, said locking device consisting essentially of a pin element 23 extending normal to the rotary axis 6 which pin element can be moved along the arrow 24. An end of the pin element 23a can engage in a recess 25, which transitions into another recess of lower supporting part 11b not illustrated in greater detail here, such that it is possible to lock the upper supporting part 11a relative to the lower supporting part 11b in respect of a rotational movement.

The pin element 23 is preferably spring-loaded by a spring element 26 such that on pulling the pin element 23 at its other end 23b, for example by means of a handle or an electric drive, the pin element 23 is pulled out of the recess 25 against a spring force of the spring element 26 and as a result also releases a locking mechanism relative to the lower supporting part 11b. As soon as a handle, not illustrated here in greater detail, which is joined to the other end 23b of the pin element 23 is released again, the pin element will re-engage in the lower supporting part 11b due to the force action of the spring element 26 and, with appropriate alignment of the upper supporting part 11a relative to the lower supporting part 11b, will enable locking in its direction of rotation.

FIG. 4 reproduces the ball bearing 20 in the installed state in a perspective view. It can be gathered from this illustration that the ball bearing comprises a ball bearing race cage 30 which is configured like a ribbon. In this case, the ribbon is aligned in such a way that it is positioned inclined or bent at an angle 28 relative to the rotary axis 6 in its widthwise direction 29. Thus the circular, ribbon-type ball bearing race cage 30 forms a segment of a cone surface which is ribbon-shaped, the notional cone having a notional base area arranged above said ball bearing race cage.

FIG. 5 shows the ball bearing 20 of the commercial vehicle seat according to the invention in a plan view. This ball bearing comprises individual balls 27 that according to FIG. 5a, which illustrates a sectional view along the section A-A, as shown in FIG. 5, are held on the left and right-hand side by first sections 31 of the ribbon-type ball bearing race cage 30.

FIG. 5b reproduces a sectional view along the section B-B as illustrated in FIG. 5. It can be gathered from this illustration that every ball 27 is supported on the left and right-hand side by the first sections 31 which increase in their expansion towards the front and rear marginal regions of each ball 27.

FIG. 5c, in a sectional view along the section C-C, as illustrated in FIG. 5, again reproduces the first section 31 of the ball bearing race cage 30 as it is assigned to a ball 27 in a front and rear marginal region of said ball 27 situated even further outside. It can be gathered from this illustration that the first section 31 passes over continuous second sections 32 between the balls, as they are also illustrated incidentally in FIG. 5d which reproduces a sectional view along the section D-D as shown in FIG. 5.

It can be gathered from the sectional view reproduced in FIG. 5d that balls are spaced apart from each other with the second sections 32 of the ball bearing race cage 30, i.e. are spaced apart from each other in a forward and backward direction with the help of sections 32 along the circular direction of the ball bearing race cage 30. Advantageously, every ball is enclosed more, in parts of their ball surface at least, by these first sections 31 and second sections 32, in order to thus ensure reliable locking of the individual balls 27 inside the ball bearing race cage 30.

FIGS. 6a and 6b again reproduce the ball bearing 20 of the commercial vehicle seat according to the invention in a plan view and in a perspective view. FIG. 6c shows the detailed view J, as indicated in FIG. 6b, enlarged. It can be gathered from this illustration that every ball 27 has the second sections 32 front and back—in relation to the circular direction—in proximity, whereby these second sections 32 enclose the balls 27 on the upper side and underside with a larger area by means of extensions 32a of the sections 32 so as in this way to retain the balls 27 reliably inside the ball bearing race cage 30 at least in the upward and downward direction.

FIG. 6d reproduces a section of the ball bearing race cage 30 in a sectional view along the section K-K, as shown in FIG. 6c. FIG. 6e shows an enlarged illustration of the sectional view reproduced in FIG. 6d. It is made clear in both Figures that every ball 27 is held on one hand, by a first section 31 which can likewise be arranged on the other side of the ball, as not shown here, and the second sections 32 which have the individual elements 32b and 32c. The elements 32b are protruding elements of the second sections 32 which are directed towards the ball bearing and are diagonally opposed to each other. The elements 32c, however, are slightly set back as regards the direction towards the ball centre of a ball 27, such that the balls 27 roll inside the ball bearing race cage 30 preferably on the elements 32b.

FIG. 7 shows a seat substructure supporting part for a vehicle seat according to a second embodiment of the invention in a lateral sectional view. Identical parts and parts with identical significance are provided with the same reference numerals.

As can be seen in FIG. 7 and in FIG. 7a, which reproduces a detailed view H, as illustrated in FIG. 7, in this case a ball bearing 20a is arranged underneath the lower supporting part 11b.

The ball bearing 20a is therefore supported both on the underside of the lower supporting part 11b and also on the upper side of a shell-like component 11aa of the upper supporting part 11a. In this case, the shell-shaped component 11aa must be joined to the upper supporting part 11a, as is not illustrated in greater detail here. In addition, the rail elements 12 and 13 for slidingly moving the seat substructure supporting part 11a, 11b and 11aa are arranged opposite the seat substructure base part 10.

Each of the balls 27 is again spaced apart from each other with second sections 32 of the ball bearing race cage 30.

FIG. 8 and FIG. 8a, which reproduces a detailed view E, as shown in FIG. 8, shows a seat substructure supporting part for a commercial vehicle seat according to a third embodiment of the invention in a lateral sectional view. Identical components and components with identical significance are provided with the same reference numerals.

In this case, a total of two ball bearings 20b and 20c with different diameters are arranged between the upper supporting part 11a and the lower supporting part 11b. Looked at in the vertical direction of the vehicle, the lower supporting part 11b is arranged between two portions of the upper supporting part 11a and is rotatably supported in each case by the ball bearings 20b and 20c relative to the upper supporting part. A locking device 23, 25 and 26 is again provided.

Such a construction according to FIG. 8 also comprises a reliable pivot bearing in respect of unintentional decoupling of the upper supporting part from the lower supporting part in the vertical direction of the vehicle as the lower supporting part 11b is encompassed by the upper supporting part 11a on both sides, i.e. on the upper side and underside, by means of the ball bearings 20b and 20c or is rotatably supported on the upper side and underside relative to this upper supporting part.

All the features disclosed in the application are claimed as essential for the invention inasmuch as they are novel by comparison with the prior art either individually or in combination.

LIST OF REFERENCE NUMBERS

1 Commercial vehicle seat
2 Seat part
3 Armrest
4 Backrest
5 Headrest
6 Rotary axis
7 Direction of circular motion
8 Direction of travel
9 Seat substructure
10 Seat substructure base part
11 Seat substructure supporting part
11a Upper supporting part
11aa Negative mould
11b Lower supporting part
12 Rail element
13 Rail element
14 Rod system
15 Lever 16 Hinge joints
17 Hinge joints
18 Hinge joints
19 Direction of arrow
20 Ball bearing
20a, 20b, 20c Ball bearing
21 Disc-shaped recess
22 Positive mould
23 Pin element, locking device
23a, 23b Pin element end
24 Arrow
25 Recess, locking device
26 Spring element, locking device
27 Ball
28 Angle
29 Widthwise direction
30 Ball bearing race cage
31 First sections
32 Second sections
32a Extensions
32b, 32c Elements

What is claimed is:

1. A commercial vehicle seat, comprising:
a seat substructure supporting part;
a seat substructure base part;
a seat part;
a pair of rail elements,
wherein the seat substructure supporting part is connected to the seat substructure base part by the rail elements,
wherein the rail elements allow the seat substructure supporting part to be translated relative to the seat substructure base part,
wherein the seat substructure supporting part comprises an upper supporting part joined to an underside of the seat part and a lower supporting part joined to the seat substructure base part,
at least one roller bearing with a roller bearing ring, which extends orbitally about a rotary axis running in a vertical direction of said vehicle seat, arranged between the upper supporting part and the lower supporting part, in order to rotatably support said upper supporting part relative to said lower supporting part,
wherein the roller bearing is a ball bearing with a ball bearing race cage configured essentially like a ribbon and having a shape of a segment of a cone surface, wherein first sections of the ball bearing race cage are configured to hold balls of the ball bearing, wherein second sections of the ball bearing race cage are configured to space balls apart from each other, wherein the first section passes over second sections between the balls,
wherein the second sections have first and second individual elements, wherein the first individual elements are protruding elements of the second sections which are directed towards the ball bearing and are diagonally opposed to each other above and below a midline of the race cage and wherein the second individual elements are diagonally opposed to each other above and below the midline of the race cage in a direction perpendicular to a line through the diagonally opposed first individual elements and are slightly set back as regards a direction towards a ball center of one of the balls as compared to the first individual elements, such that the balls roll inside the ball bearing race cage on the first individual elements, and
wherein at least a portion of the rail elements and at least a portion of the roller bearing ring are intersected by a common plane, wherein the common plane is perpendicular to the rotary axis running in the vertical direction of said vehicle seat.

2. The commercial vehicle seat according to claim 1, wherein a widthwise direction of the ball bearing race cage extends at an angle ranging from 10° to 80° to a direction of the rotary axis.

3. The commercial vehicle seat according to claim 2, wherein the ball bearing race cage is circular and rests on a front and on a back side of every ball of the ball bearing in a direction of circular motion.

4. The commercial vehicle seat according to claim 1, wherein the ball bearing is arranged on an underside in a disc-shaped recess formed centrally as a negative mould in the lower supporting part and on an upper side rests on a disc-shaped positive mould formed centrally on an underside of the upper supporting part.

5. The commercial vehicle seat according to claim 1, wherein on the upper side the ball bearing is supported on an underside of the upper supporting part and on the underside it is supported in a bowl-shaped negative mould joined to the lower supporting part.

6. The commercial vehicle seat according to claim 1, wherein two circular ball bearings with different diameters are arranged between the upper supporting part and the lower supporting part.

7. The commercial vehicle seat according to claim 1, wherein the upper supporting part, which is rotatably supported relative to the lower supporting part, comprises a locking device for locking the upper supporting part against rotating movements relative to the lower supporting part.

8. The commercial vehicle seat according to claim 5, wherein the locking device comprises a manually operated, spring-loaded movable pin element which is mounted on the upper supporting part, wherein the pin element is capable of engaging in a recess of complementary design to an end of a pin element in the lower supporting part.

9. The commercial vehicle seat according to claim 1, wherein the first sections increase in their expansion towards front and rear marginal regions of each ball.

10. The commercial vehicle seat according to claim 1, wherein the second sections enclose the balls on an upper side and underside by means of extensions of the second sections.

11. A commercial vehicle seat, comprising:
a seat substructure supporting part;
a seat substructure base part each attached underneath;
a seat part, the seat substructure supporting part being at least one of movable and height-adjustable relative to the seat substructure base part,
wherein the seat substructure supporting part comprises an upper supporting part joined to an underside of the seat part and a lower supporting part joined to the seat substructure base part,
wherein at least one roller bearing with a roller bearing ring, which extends orbitally about a rotary axis running in a vertical direction of said vehicle seat, is arranged between the upper supporting part and the lower supporting part, in order to rotatably support said upper supporting part relative to said lower supporting part,
wherein the roller bearing is a ball bearing with a ball bearing race cage configured essentially like a ribbon and having a shape of a segment of a cone surface,
wherein balls of the ball bearing are held by first sections of the ball bearing race cage, wherein the first sections increase in their expansion towards front and rear marginal regions of each ball, wherein the first section passes over continuous second sections of the ball bearing race cage between the balls, wherein the balls are spaced apart from each other with the second sections, wherein the second sections have first and second individual elements, wherein the first individual elements are protruding elements of the second sections which are directed towards the ball bearing and are diagonally opposed to each other above and below a midline of the race cage and wherein the second individual elements are diagonally opposed to each other above and below the midline of the race cage in a direction perpendicular to a line through the diagonally opposed first elements and are slightly set back as regards a direction towards a ball center of one of the balls as compared to the first individual element, such that the balls roll inside the ball bearing race cage on the first individual elements.

* * * * *